No. 780,405. Patented January 17, 1905.

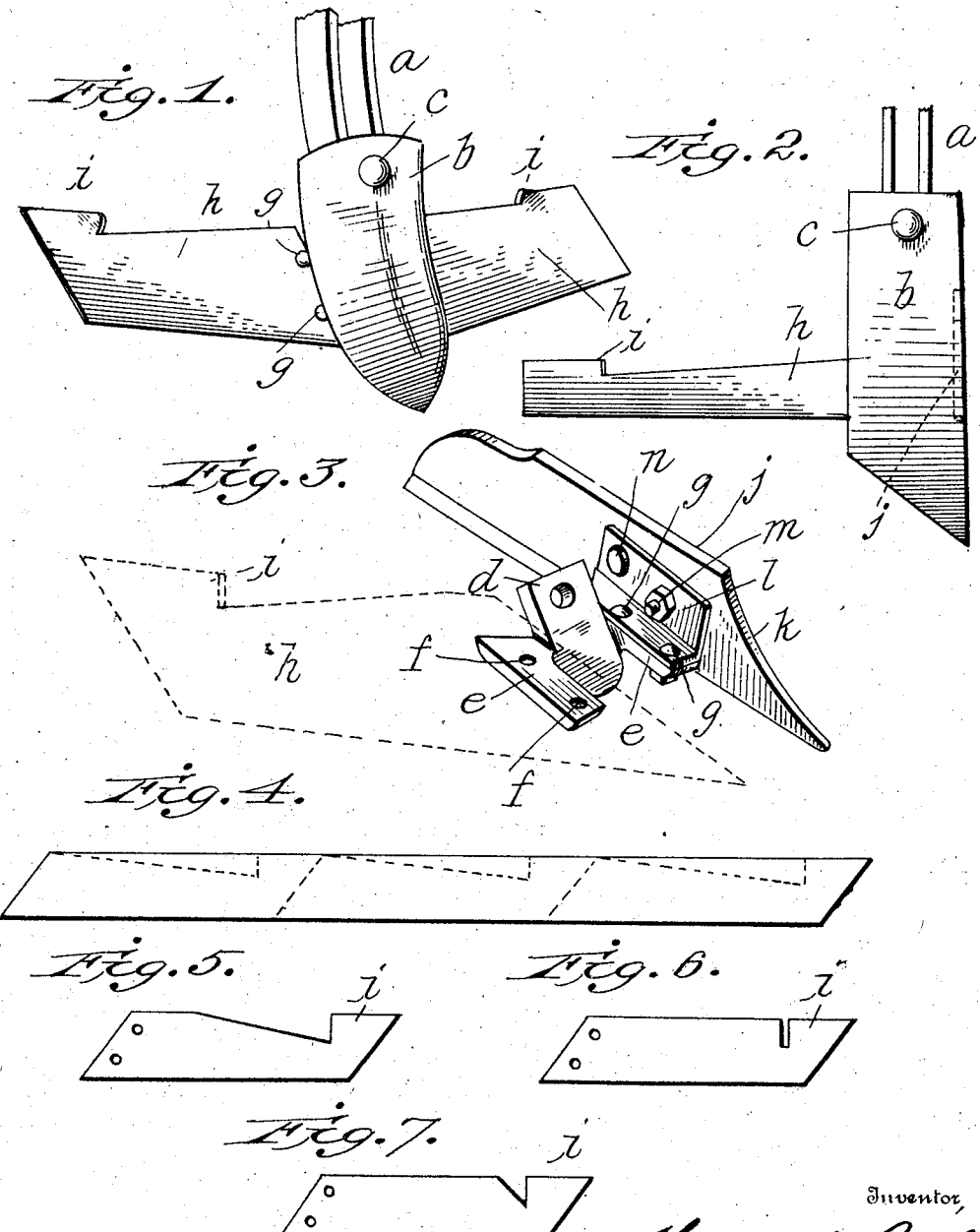

UNITED STATES PATENT OFFICE.

THADDEUS W. BOYLE, OF JACKSONVILLE, FLORIDA.

COTTON AND CORN CULTIVATOR.

SPECIFICATION forming part of Letters Patent No. 780,405, dated January 17, 1905.

Application filed May 6, 1904. Serial No. 206,685.

*To all whom it may concern:*

Be it known that I, THADDEUS W. BOYLE, a citizen of the United States of America, and a resident of Jacksonville, county of Duval, State of Florida, have invented certain new and useful Improvements in Cotton and Corn Cultivators, of which the following is a full and clear specification, reference being had to the accompanying drawings, in which—

Figure 1 is a perspective view of the lower end of a plow foot or stock carrying my improvement. Fig. 2 is a front elevation thereof, showing one of the sweeps removed and replaced by a landside-blade; Fig. 3, a detail perspective view showing the construction of the head for holding the sweeps and landside and the manner of fastening the landside to the head; Fig. 4, a view showing the simple manner in which the sweeps can be cut from a strip or plate of sheet metal without undue waste of material; Fig. 5, a detail view of one of the sweeps, and Figs. 6 and 7 similar views showing slightly-modified forms of the sweep.

This invention relates to that class of cultivators in which in addition to a "bull-tongue" or "scooter" shovel a pair of rearwardly and outwardly inclined scraper-blades are secured to the plow-foot. This implement is employed very extensively in the Southern States for the shallow cultivation of cotton and corn. In "barring off" cotton one of the blades is removed, so that the shovel may run close to the growing plants; but when one of the blades is thus removed it is practically impossible to accurately steer the plow, and as a consequence it dodges about and frequently cuts into the growing crop.

It is one of the objects of my invention to overcome this defect, and I accomplish this object by so constructing the head carrying the wings that when the left blade is removed it may be replaced by a landside blade or bar which will lie in such relation to the adjacent edge of the shovel that it will serve to accurately guide the plow without interfering with the free movement of the plow through the soil or permit the soil to work in between the shovel and the landside, as more fully hereinafter set forth.

Another object of my invention is to so construct the scrapers not only that they may be made cheaply, but also that they may be readily adapted to the second plowing of cotton, in which case it is desirable to throw a portion of the soil toward the plants. The present custom is to take the scrapers to the nearest smith and have the outer upper corners of the blades curled to the desired degree and afterward when the second plowing is finished return the plow to the smith to straighten out the curled corners. To overcome this drawback, I so construct and shape the blades that the farmer himself with the use of but a simple tool, as a hammer, may change the shape of the sweeps at will, thus avoiding the inconvenience and expense of taking them to a skilled mechanic every time they are to be reshaped, as more fully hereinafter described.

Referring to the drawings by reference-letters, $a$ designates the plow foot or stock, which is of the usual construction, and $b$ the plow-shovel, usually employed for cultivating cotton and corn, this shovel being secured to the plow-foot by a bolt $c$ in the usual manner. The bolt $c$ in addition to securing the plow-shovel also clamps to the rear side of the plow-foot the head, which consists of a plate $d$, adapted to lie against the inclined rear side of the plow-foot and provided at each side edge with an integral wing $e$, which inclines downward and forward and lies on the outside of and close to the outer side of the foot. These wings are made as narrow as is possible without sacrificing the necessary strength and durability; but in no case will they be wide enough to project beyond the side edges of the plow-shovel. The wings terminate just behind the plow-shovel and are provided with holes $f$ for the passage of the bolts $g$, which secure the sweeps or the landside to them. The sweeps are designated by the letter $h$, and their inner inclined edges lie close to the plow-foot, just behind the plow-shovel. Each sweep is constructed of a thin plate of sheet-steel, and they are preferably cut from a narrow plate, as shown at Fig. 4. The upper edge of each sweep is notched or slit near its outer end, so as to form at the upper outer end of the sweep an upstanding angular part $i$. The notch may be a wide one, as shown in Figs. 4 and 5, or a narrow one, as shown in Fig. 7, or a mere slit, as shown in Fig. 6, as is evident. The upper edge of the corner $i$, as will be observed, does not project above the main body of the sweep.

It will be observed that when the sweeps are in place the plow-shovel completely covers the space between their inner ends and the securing-bolts $g$, thereby preventing the soil clogging at the foot of the plow. When it is desired to plow close to the growing plants in barring off cotton, the left-hand sweep is removed and the landside $j$ substituted therefor. When this landside is secured to the lug or wing which previously held the sweep, its forward curved edge $k$ lies close up behind the adjacent outer edge of the shovel, so that the soil cannot work in behind the shovel.

As shown in Fig. 2, by making the wing $e$ narrow the landside is brought entirely within the side edge of the shovel. The landside is attached to the wing by any suitable means; but I prefer using an angular plate $l$, which is bolted by a bolt $m$ to the inner side of the landside and has its inward-extending flange bolted to the wing by the same bolts $g$ which previously held the sweep to the wing. To avoid the necessity of using another bolt like the bolt $m$, I form on the inner side of the landside an integral lug $n$, which projects through a hole in the angular plate, and thereby prevents the landside working loose.

It will be observed that an important feature of my invention lies in making the wings, or at least the left one, to which the landside is to be secured sufficiently narrow that when the landside is in place it will lie just behind the adjacent outer edge of the shovel. In this way a double-sweep cultivator may be readily converted into a single-sweep landside cultivator when the farmer desires to plow close to the growing plants and at the same time plow out the weeds and grass between the rows. In this manner of using the plow the landside is essential to prevent the plow dodging about, and thus cutting into the growing plants. In other words, the landside acts as a rudder in enabling the plowman to run close to the plants without destroying any of them.

The advantage in making the sweep of thin bendable sheet metal and forming the integral upstanding part at its outer end lies in the fact that said upstanding part may be readily curled up when it is desired to throw the soil toward the plants, as is the case in the second plowing of cotton. The blade being made of bendable sheet metal, the upstanding part may be readily curled and straightened out again by the use of a hammer or other simple tool that the farmer may possess, and by reason of this provision it is unnecessary to take the plow to a blacksmith-shop to have the blades reforged whenever it is necessary to properly shape them for the second plowing of cotton. The present practice is to take the plow to the nearest blacksmith-shop and have the end portions forged up and curled by a skilled workman. This is often quite inconvenient and expensive, especially where the shop is at a considerable distance from the farm. With my improvement the sweep can be readily shaped by the farmer himself for the work he desires to do, as the upstanding corner can be curled and straightened out by any simple tool and by an unskilled person.

It will be understood from the foregoing that I am not limited to the exact construction shown and described, but that I can depart from said specific construction without departing from the spirit of my invention.

Having thus described my invention, what I claim as new, and desire to secure by Letters Patent, is—

1. A plow-sweep constructed of a single piece of sheet metal and having its inner end adapted for attachment to a plow and having a free upstanding integral angular part at its upper outer end, said part being adapted to be curled up and flattened out again and terminating approximately even with the upper edge of the sweep.

2. In a convertible cultivator, the combination of a plow-foot and a plow-shovel attached to the front side thereof, a head part secured to the plow-foot behind the plow-shovel and having a pair of wings projecting laterally, the side edge of the left wing terminating within the outer edge of the shovel, and detachable plow-sweeps attached at their inner ends to said wings, whereby when a landside is substituted for the left sweep it will lie within the side edge of the shovel.

3. In combination with a plow-foot and a plow-shovel bolted to the front side thereof, of a head attached to the rear side of the plow-foot and provided with a pair of wings extending forwardly and downwardly behind the plow-shovel, a sweep attached to one of said wings, and a landside detachably attached to the other of said wings, the wing to which the landside is attached being sufficiently narrow to bring the forward edge of the landside within the side edge of the plow-shovel.

In testimony whereof I hereunto affix my signature, in the presence of two witnesses, this 3d day of May, 1904.

THADDEUS W. BOYLE.

Witnesses:
ALX. HEDINGRIN,
Mrs. E. J. BLINN.